United States Patent
Kim et al.

(10) Patent No.: US 8,274,916 B2
(45) Date of Patent: Sep. 25, 2012

(54) DEVICE AND METHOD FOR MEASURING LOCATION OF TERMINAL

(75) Inventors: Byung Doo Kim, Daejeon (KR); Youngsu Cho, Seoul (KR); Sung Jo Yun, Daejeon (KR); Myung In Ji, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 291 days.

(21) Appl. No.: 12/686,078

(22) Filed: Jan. 12, 2010

(65) Prior Publication Data

US 2011/0064000 A1 Mar. 17, 2011

(30) Foreign Application Priority Data

Sep. 16, 2009 (KR) ........................ 10-2009-0087712

(51) Int. Cl.
*H04L 12/28* (2006.01)
(52) U.S. Cl. ........................................ 370/254; 370/255
(58) Field of Classification Search ........................ None
See application file for complete search history.

(56) References Cited

U.S. PATENT DOCUMENTS

| 7,502,620 | B2 | 3/2009 | Morgan et al. |
| 7,898,977 | B2* | 3/2011 | Roese et al. ................ 370/254 |
| 2011/0064000 | A1* | 3/2011 | Kim et al. ................ 370/255 |
| 2011/0069641 | A1* | 3/2011 | Hall et al. ................ 370/255 |

OTHER PUBLICATIONS

Lionel Reyero and Gilles Delisle, "A Pervasive Indoor-Outdoor Positioning System", Journal of Networks, vol. 3, No. 8, Nov. 2008.

* cited by examiner

*Primary Examiner* — Robert Wilson
(74) *Attorney, Agent, or Firm* — Staas & Halsey LLP (57) ABSTRACT

A terminal location measuring device includes a database for storing registration information of a plurality of access points (AP's) forming a first infrastructure system for wireless LAN-based indoor location determination. The terminal location measuring device sets a search range of a database by using location information of the terminal acquired through a second infrastructure system that is different from the first infrastructure system, an identifier of at least one of a plurality of AP's, and a signal measurement value. The terminal location measuring device extracts registration information of an AP having the same identifier as at least one AP within the search range of the database, and measures a location of the terminal by using registration information of the AP.

13 Claims, 6 Drawing Sheets

DEVICE AND METHOD FOR MEASURING LOCATION OF TERMINAL

CROSS-REFERENCE TO RELATED APPLICATION

This application claims priority to and the benefit of Korean Patent Application No. 10-2009-0087712 filed in the Korean Intellectual Property Office on Sep. 16, 2009, the entire contents of which are incorporated herein by reference.

BACKGROUND OF THE INVENTION (a) Field of the Invention

The present invention relates to a method and device for measuring a location of a terminal.

(b) Description of the Related Art

There are various location determination technologies using a radio infrastructure depending on infrastructure types and service ranges.

A global navigation satellite system (GNSS) is a system for determining a location of a user by using a signal of a satellite in orbit of the earth. The GNSS provides high location accuracy having an error of location information within 10 m and availability in the case of level ground or suburbs acquiring a direct line of sight of a satellite and a receiver. On the contrary, in the case of the urban areas that is a non-line of sight area, the error of location information is substantially 50 meters because of multipath errors, and particularly, in the case of a room, received signal sensitivity is deteriorated such that the GNSS cannot determine a location.

A cellular-based location determination technology determines a user's location by using location information of a mobile communication base station and a measured signal, and it can be classified as cell-ID, enhanced-observed time difference (E-OTD), and advanced-forward link trilateration (AFLT) according to the number of base stations available for a terminal. The cellular-based location determination technologies have a merit of determining the location in a room as well as outside the room because of the characteristics of the mobile communication infrastructure having urban areas and most suburban areas as a service range. However, since accuracy of location determination depends on how the base station is disposed and the error of location information is 100 to 800 meters on the average, it is inappropriate for indoor and exterior navigation service requiring location accuracy.

The wireless LAN (local area network)-based location determination technology is a representative method for overcoming the difficulty of indoor location determination, and it calculates the location of a terminal by using a database including an identifier and a reference location of an access point (AP) and a measured value of the AP received from the terminal. That is, the wireless LAN-based location determination technology extracts the AP that has the same identifier as the identifier of the AP for the measured value from the database, and determines the location of the terminal by using the extracted AP. However, when the service area is enlarged and the database is built in a vast manner, it is required to compare the identifier of the AP for the measured value and the identifier of all the AP's of the database, and hence, it takes much time to search the database, location calculation is resultantly slowed, and it is inappropriate for a service that requires a quick response.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a terminal location determining device and method for reducing time used for searching a database.

An exemplary embodiment of the present invention provides a method for a terminal location measuring device to measure a location of a terminal, including: acquiring an identifier of at least one AP of a plurality of access points (AP's) forming a first infrastructure system and a signal measurement value; acquiring location information of the terminal by using a second infrastructure system that is different from the first infrastructure system; setting a search range of a database for storing location information of the plurality of AP's by using the identifier of at least one AP, the signal measurement value, and location information of the terminal; extracting location information of an AP having the same identifier as the identifier of the at least one AP within the search range of the database; and measuring a location of the terminal by using extracted location information of the AP.

Another embodiment of the present invention provides a device for measuring a location of a terminal including: a database for storing registration information on a plurality of access points (AP's) for forming a first infrastructure system for wireless LAN-based indoor location determination; a search range setter for setting a search range of the database by using location information of the terminal acquired through a second infrastructure system that is different from the first infrastructure system, an identifier of at least one AP of the plurality of AP's, and a signal measurement value; a registration information extractor for extracting registration information of an AP having an identifier corresponding to the identifier of the at least one AP within the search range of the database; and a location calculator for calculating a location of the terminal by using the extracted registration information of the AP.

According to an embodiment of the present invention, registration information on the AP needed for measuring the location of the terminal can be quickly acquired from the database by reducing a search range in the database, and unneeded calculation can be reduced, thereby reducing the time for measuring the location of the terminal. Also, location accuracy can be improved.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

A method and device for measuring a location of a terminal according to an exemplary embodiment of the present invention will now be described with reference to accompanying drawings.

Figure 1:
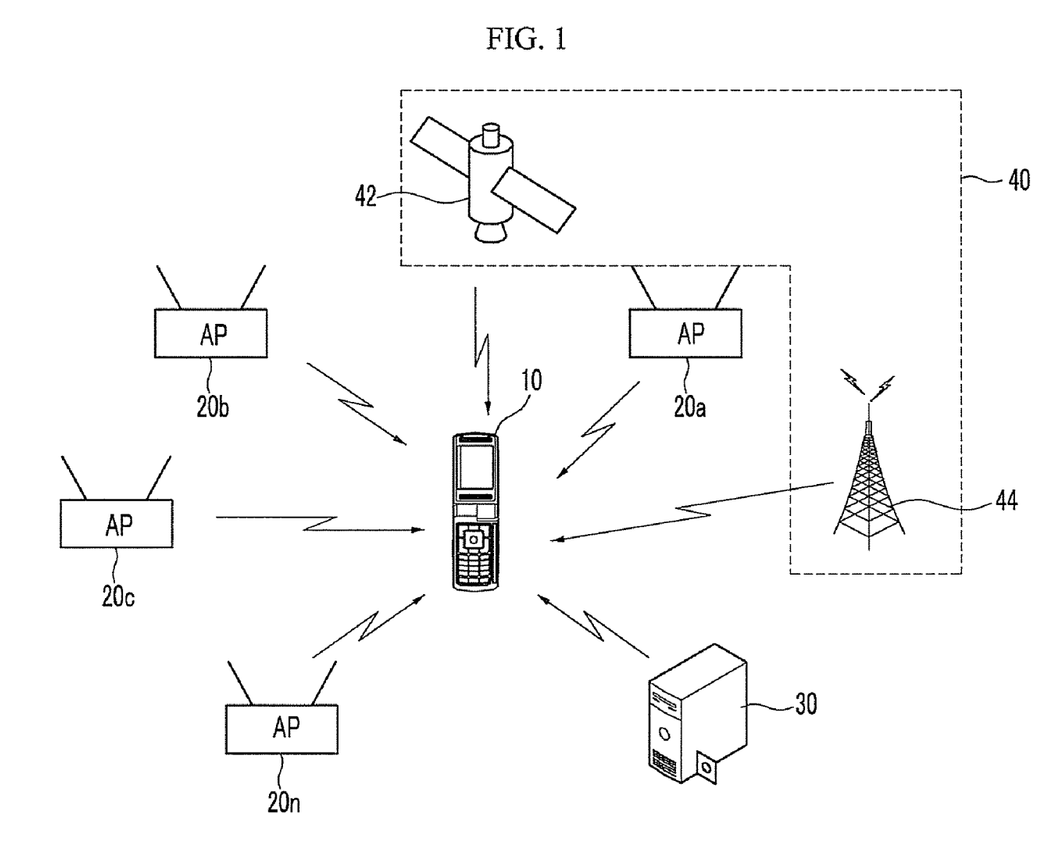
FIG. 1 shows a system for determining a wireless local area network (WLAN)-based location according to an exemplary embodiment of the present invention.

FIG. 1 shows a system for determination a WLAN-based location according to an exemplary embodiment of the present invention.

Referring to FIG. 1, the system for determining a WLAN-based location includes a terminal 10, a plurality of access points AP's 20a to 20n, a database server 30, and an additional infrastructure system 40.

The terminal 10 acquires an identifier and a signal measurement value of the at least one AP having transmitted a radio signal by using the radio signal transmitted by at least one of the AP's 20a to 20n, and receives location information of the terminal 10 from the additional infrastructure system 40. In this instance, a MAC address can be used for the identifier of the AP, and a received signal strength indicator (RSSI), a signal to noise ratio (SNR), and a measurement value of distance from the terminal are usable for the signal measurement value. Also, various methods can be used to measure the RSSI and the SNR.

The terminal 10 sets a search range of the database of the AP's 20a-20n stored in the database server 30 by using location information of the terminal 10 received from the additional infrastructure system 40, an identifier of at least one AP having transmitted the radio signal, and a signal measurement value. The terminal 10 extracts registration information of the AP for measuring the location of the terminal in the search range of the database of the AP's 20a-20n, and measures the location by using the extracted registration information of the AP. In this instance, the registration information includes location information and characteristic information.

The AP's 20a-20n form an indoor location determination wireless communication infrastructure for measuring the location of the terminal 10 in the room, and transmit a radio signal to the terminal 10 so as to measure the location of the terminal 10.

The database server 30 stores information of the AP's 20a to 20n for configuring the indoor location determination wireless communication infrastructure. The AP's 20a to 20n stored in the database server 30 will be denoted as AP's 20a to 20n so as to distinguish the AP having transmitted the radio signal to the terminal 10 and the AP stored in the database server 30. For ease of description, the terminal 10 is assumed to receive the radio signal transmitted by the AP's 20a to 20i from among the AP's 20a to 20n.

The additional infrastructure system 40 provides location information of the terminal 10 to the terminal 10.

A global positioning system (GPS) 42 and a wireless network system 44 are illustrated for the additional infrastructure system 40 in FIG. 1. When the additional infrastructure system 40 is the GPS 42, the terminal 10 receives location information of the terminal 10 from the GPS 42. When the additional infrastructure system 40 is the wireless network system 44, the terminal 10 receives location information of the terminal 10 from the wireless network system 44 according to the network-based wireless location determination method. The network-based wireless location determination method includes a method for measuring the time of arrival (TOA) between the terminal and the base station, a method for measuring the time difference of arrival (TDOA) from two different base stations, a method for measuring a direction of arrival (DOA) and an angle of arrival (AOA) at the terminal, and a cell-ID method.

Figure 2:
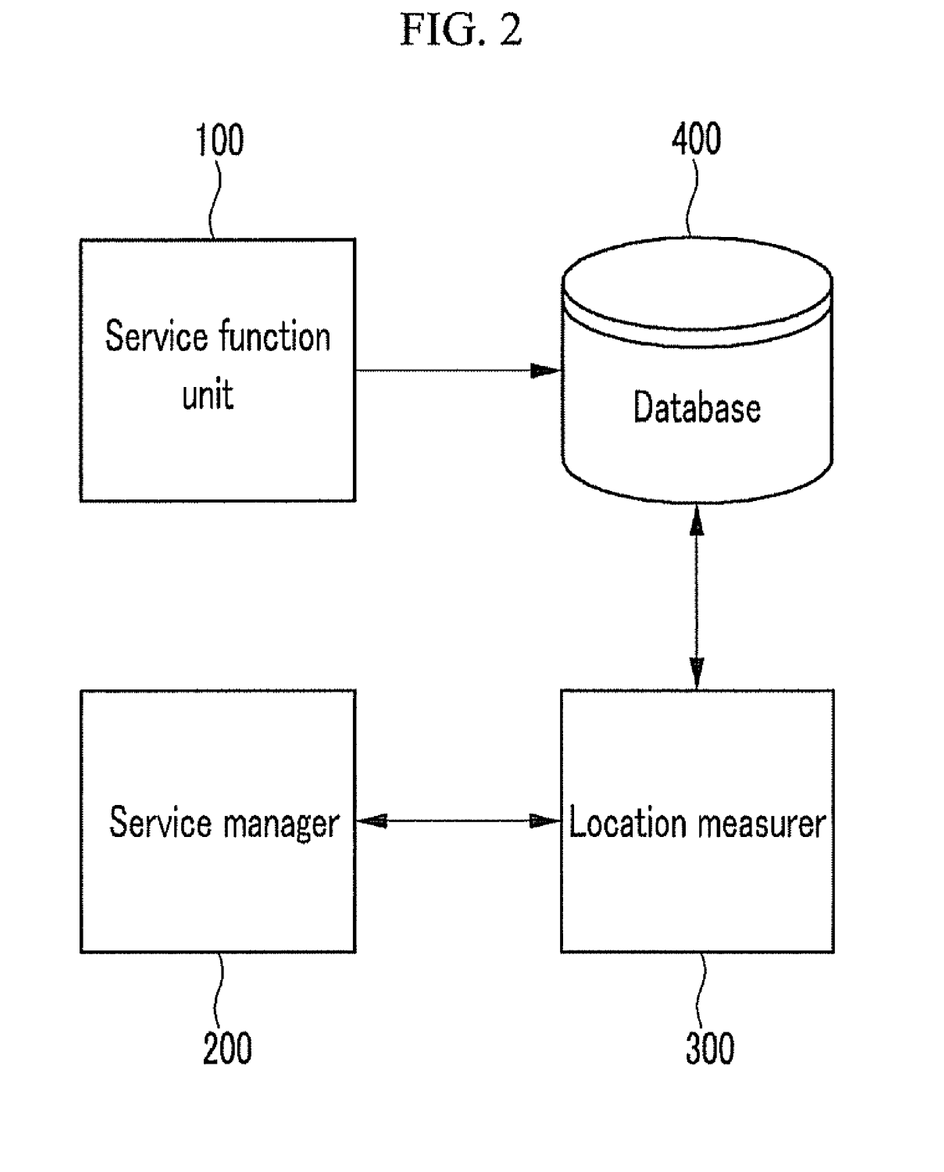
FIG. 2 shows a schematic diagram of a terminal shown in FIG. 1.

FIG. 2 shows a schematic diagram of a terminal shown in FIG. 1.

Referring to FIG. 2, the terminal 10 includes a service function unit 100, a service manager 200, a location measurer 300, and a database 400.

The service function unit 100 requests information of the AP's 20a to 20n from the database server 30, receives information on the AP's 20a to 20n from the database server 30, and stores the same in the database 400. In this instance, information request and receipt on the AP's 20a to 20n from the database server 30 can be performed through TCP/IP connection.

The service manager 200 manages location information of the terminal 10 measured by the location measurer 300 and temporal information used to generate location information of the terminal 10, and processes errors.

The location measurer 300 acquires identifiers and signal measurement values of the AP's 20a to 20i from the radio signal transmitted by the AP's 20a to 20i, and sets the search range of the database 400 by using location information of the terminal 10 acquired through the additional infrastructure system 40, the identifiers of the AP's 20a to 20i, and the signal measurement value.

Also, the location measurer 300 extracts registration information of the AP having the same identifier as those of the AP's 20a to 20i within the search range of the database 400, and calculates the location of the terminal 10 by using the extracted registration information of the AP.

The database 400 stores information on the AP's 20a to 20n provided by the database server 30.

Figure 3:
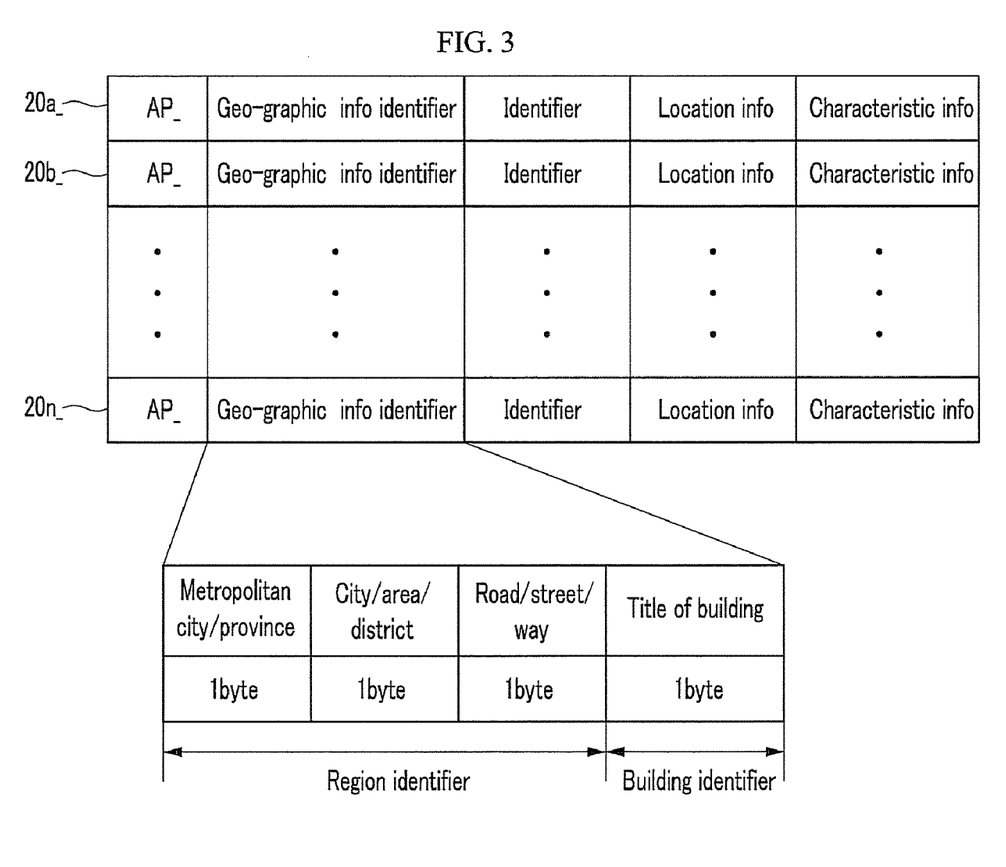
FIG. 3 shows a database illustrated in FIG. 2.

FIG. 3 shows a database illustrated in FIG. 2.

Referring to FIG. 3, the database 400 is generated based on the geo-graphic information identifiers of the AP's 20a to 20n, and the database 400 stores geo-graphic information identifiers of the AP's 20a to 20n, identifiers of the AP's 20a to 20n, location information of the AP's 20a to 20n, and characteristic information of the AP's 20a to 20n.

The geo-graphic information identifiers of the AP's 20a to 20n indicate geo-graphic information where the AP's 20a to 20n are installed, and may include a region identifier and a building identifier. The region identifier indicates the region where the AP's 20a to 20n are installed, a "metropolitan city/province" is shown with 1 byte, "city/area/district" is shown with 1 byte, and "road/street/way" is shown with 1 byte. The building identifier indicates the title of the building in which the AP's 20a to 20n are built, and the "name of the building" is shown with 1 byte. That is, a 4-byte geo-graphic information identifier can be configured by assigning an identifier to each building located in the corresponding way. Therefore, unique identifiers can be assigned to one road/street/way administrative section for 255 buildings, and when a memory geo-graphic is insufficient in assigning a unique identifier for the building in the corresponding region, it can be solved by increasing the number of bytes.

The geo-graphic information identifier can be defined in various forms having a characteristic for distinguishing the geographical geo-graphic.

Location information of the AP's 20a to 20n indicates installation locations of the AP's 20a to 20n, and the characteristic information of the AP's 20a to 20n indicates signal output characteristics of the AP's 20a to 20n.

Figure 4:
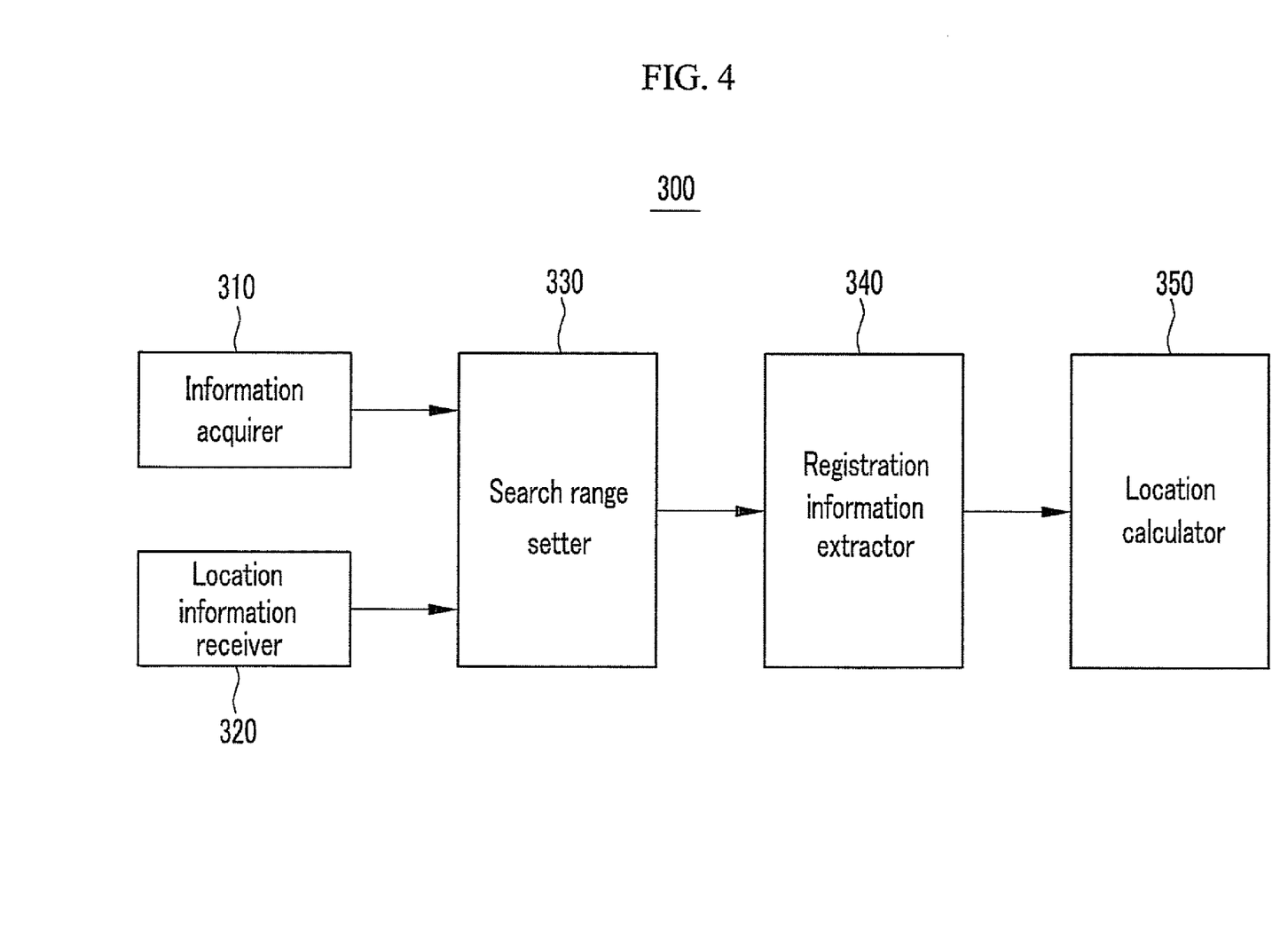
FIG. 4 shows a location measurer shown in FIG. 2.
Figure 5:
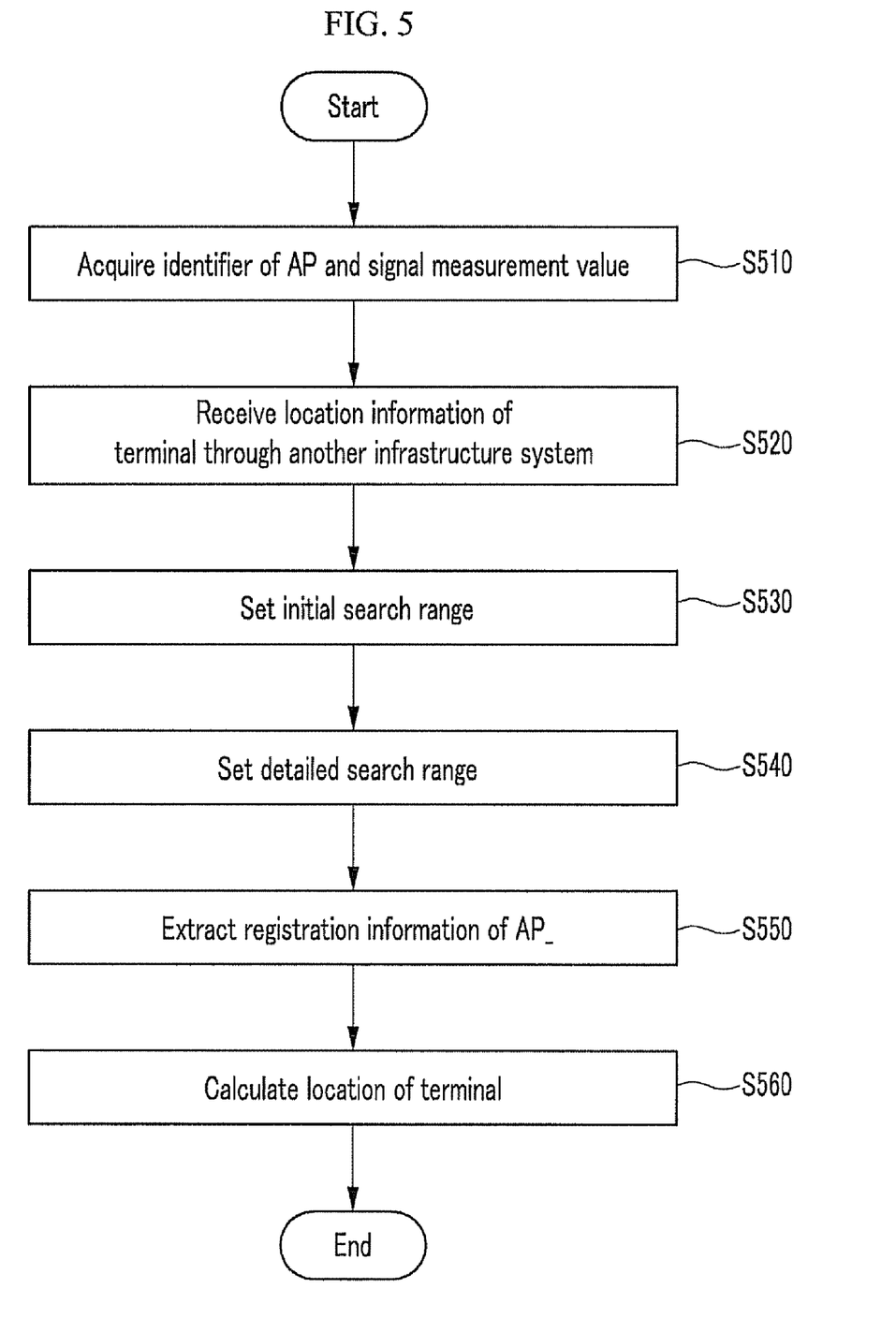
FIG. 5 shows a method for measuring a location according to an exemplary embodiment of the present invention.

FIG. 4 shows a location measurer shown in FIG. 2, and FIG. 5 shows a method for measuring a location according to an exemplary embodiment of the present invention.

Referring to FIG. 4, the location measurer 300 includes an information acquirer 310, a location information receiver 320, a search range setter 330, a registration information extractor 340, and a location calculator 350.

Referring to FIG. 5, the information acquirer 310 acquires the identifiers of the AP's 20a to 20i and signal measurement values by using the radio signals output by the AP's 20a to 20i from among the AP's 20a to 20n (S510). For example, the information acquirer 310 acquires MAC addresses of the AP's 20a to 20i having output the radio signals, and measures the RSSI of the radio signals output by the AP's 20a-20i.

The location information receiver 320 receives location information of the terminal 10 through the additional infrastructure system 40 (S520).

The search range setter 330 sets an initial search range of the database 400 by using location information of the terminal 10 received through the additional infrastructure system 40 (S530), and sets a detailed search range of the database 400 by using the identifiers of the AP's 20a to 20i and the signal measurement values acquired by the information acquirer 310 within the initial search range of the database (S540).

The registration information extractor 340 extracts registration information of the AP having an identifier corresponding to the identifiers of the AP (20a-20i) within the detailed search range of the database 400 (S550).

The location calculator 350 calculates the location of the terminal 10 by using the extracted registration information of the AP (S560).

Figure 6:
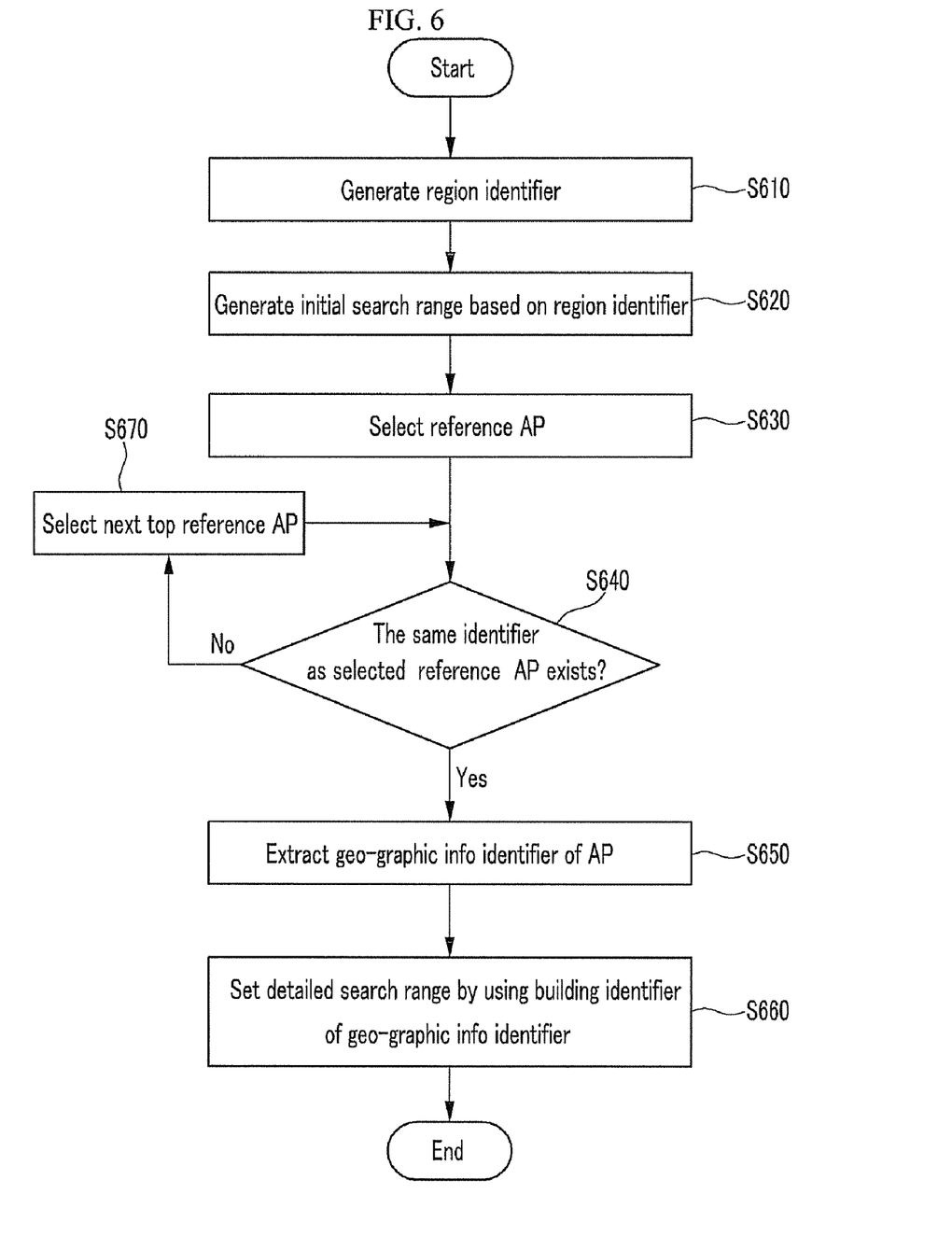
FIG. 6 shows a method for setting a search range according to an exemplary embodiment of the present invention.

FIG. 6 shows a method for setting a search range according to an exemplary embodiment of the present invention.

Referring to FIG. 6, the search range setter 330 calculates a region identifier from location information of the terminal 10 acquired by using the additional infrastructure system 40 (S610), and calculates an initial search range of the database 400 with reference to the calculated region identifier (S620).

The search range setter 330 selects one reference AP from among the AP's 20a to 20i by using the signal measurement values of the AP's 20a to 20i acquired by the information acquirer 310 (S630), and searches to find whether there is an AP having an identifier that corresponds to that of the reference AP in the initial search range of the database 400 (S640). For example, when the RSSI is used for the signal measurement value, the search range setter 330 selects the AP that has the maximum value of RSSI from among the RSSI's of the AP's 20a to 20i as the reference AP. Also, when the SNR is used for the signal measurement value, the search range setter 330 can select the AP having the maximum value of the SNR from among the SNR's of the AP's 20a to 20i as the reference AP, and when the distance measurement value is used for the signal measurement value, the search range setter 330 can select the AP that is expected to be the shortest distance from the terminal 10 as the reference AP.

When there is an identifier that corresponds to the identifier of the reference AP in the initial search range of the database 400, the search range setter 330 extracts a geo-graphic information identifier of the AP that has an identifier corresponding to the identifier of the reference AP (S650).

The search range setter 330 sets the detailed search range of the database 400 by using a building identifier of the extracted geo-graphic information identifier (S660).

The registration information extractor 340 extracts registration information of the AP corresponding to the identifiers of the AP's 20a to 20i acquired by the information acquirer 310 in the detailed search range of the database 400.

The registration information extractor 340 selects a second top priority reference AP when there is no identifier that corresponds to the identifier of the reference AP in the initial search range of the database 400 (S670), and then extracts registration information of the AP through the same above-described operation.

Accordingly, when the registration information of the AP for measuring the location of the terminal 10 is extracted from the database 400, the location calculator 350 calculates the location of the terminal 10 by using the extracted registration information of the AP.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for determining a location of a terminal, the method comprising:
   acquiring an identifier of at least one AP of a plurality of access points (AP's) forming a first infrastructure system and a signal measurement value;
   acquiring location information of the terminal by using a second infrastructure system that is different from the first infrastructure system;
   setting a search range of a database storing location information of the plurality of AP's by using the identifier of at least one AP, the signal measurement value, and location information of the terminal;
   extracting location information of an AP having the same identifier as the identifier of at least one AP within the search range of the database; and
   calculating a location of the terminal by using the extracted location information of the AP.

2. The method of claim 1, wherein the database includes a geo-graphic information identifier for showing geo-graphic information of the plurality of AP's, and
   the setting of the search range of the database includes:
   setting an initial search range of the database from location information of the terminal;
   selecting a reference AP from among the at least one AP by using the signal measurement value of the at least one AP;
   extracting a geo-graphic information identifier of an AP having an identifier that corresponds to identifier of the reference AP in the initial search range of the database; and
   setting a detailed search range of the database by using the extracted geo-graphic information identifier.

3. The method of claim 2, wherein the geo-graphic information identifier includes a region identifier and a building identifier, and
   the setting of the search range of the database includes:
   extracting a region identifier from location information of the terminal; and setting an initial search range of the database by using the extracted region identifier.

4. The method of claim 2, wherein the geo-graphic information identifier includes a region identifier and a building identifier, and the detailed search range of the database is set by using a building identifier of the extracted geo-graphic information identifier.

5. The method of claim 1, wherein the first infrastructure system is a wireless communication system for indoor location determination based on a wireless LAN.

6. The method of claim 1, wherein the second infrastructure system includes at least one of a global positioning system and a wireless network system.

7. The method of claim 1, wherein the signal measurement value includes at least one of a received signal strength indicator (RSSI), a signal to noise ratio (SNR), and a distance measurement value from the terminal.

8. A device for measuring a location of a terminal, comprising:

a database storing registration information on a plurality of access points (AP's) for forming a first infrastructure system for wireless LAN-based indoor location determination, the registration information including location information and characteristic information;

a search range setter for setting a search range of the database by using location information of the terminal acquired through a second infrastructure system that is different from the first infrastructure system, an identifier of at least one AP of the plurality of AP's, and a signal measurement value;

a registration information extractor for extracting registration information of an AP having an identifier corresponding to the identifier of the at least one AP within the search range of the database; and a location calculator for calculating a location of the terminal by using the extracted registration information of the AP.

9. The device of claim 8, wherein the registration information includes geo-graphic information identifiers for showing geo-graphic information of the plurality of AP's, identifiers of the plurality of AP's, and location information, and the search range setter sets the search range of the database by using the geo-graphic information identifier.

10. The device of claim 9, wherein:

the geo-graphic information identifier includes a region identifier and a building identifier; and the search range setter sets an initial search range of the database by using the region identifier from location information of the terminal, and sets a detailed search range of the database by using a building identifier of an AP having the same identifier as an identifier of a reference AP from among the at least one AP in the initial search range.

11. The device of claim 10, wherein the search range setter selects the reference AP by using a signal measurement value of the at least one AP.

12. The device of claim 11, wherein the signal measurement value includes at least one of a received signal strength indicator (RSSI), a signal to noise ratio (SNR), and a distance measurement value from the terminal.

13. The device of claim 8, wherein the second infrastructure system includes at least one of a global positioning system and a wireless network system.

* * * * *